J. S. LOCKARD.
WAGON BRAKE.
APPLICATION FILED AUG. 29, 1919.

1,336,909.

Patented Apr. 13, 1920.

Inventor
James S. Lockard

UNITED STATES PATENT OFFICE.

JAMES S. LOCKARD, OF LANDRUM, SOUTH CAROLINA.

WAGON-BRAKE.

1,336,909.  Specification of Letters Patent.  Patented Apr. 13, 1920.

Application filed August 29, 1919. Serial No. 320,615.

*To all whom it may concern:*

Be it known that I, JAMES S. LOCKARD, a citizen of the United States, residing at Landrum, in the county of Spartanburg and State of South Carolina, have invented certain new and useful Improvements in Wagon-Brakes, of which the following is a specification.

My invention relates to new and useful improvements in wagon brakes, the primary object of which is to provide means for locking the brake in its applied position.

A further object of the invention is to provide a device of the above mentioned character whereby the applying of the brake and the operation of the locking means is governed by the same lever.

A further object of the invention is to provide a device of the above mentioned character that will automatically operate upon application of the brake and remain locked until released by the operation of the brake lever.

A further object of the invention is to provide a device of the above mentioned character which may be attached to any vehicle of the ordinary structure without materially altering the same.

Other objects and advantages of the invention will be apparent during the course of the following description.

Figure 1:
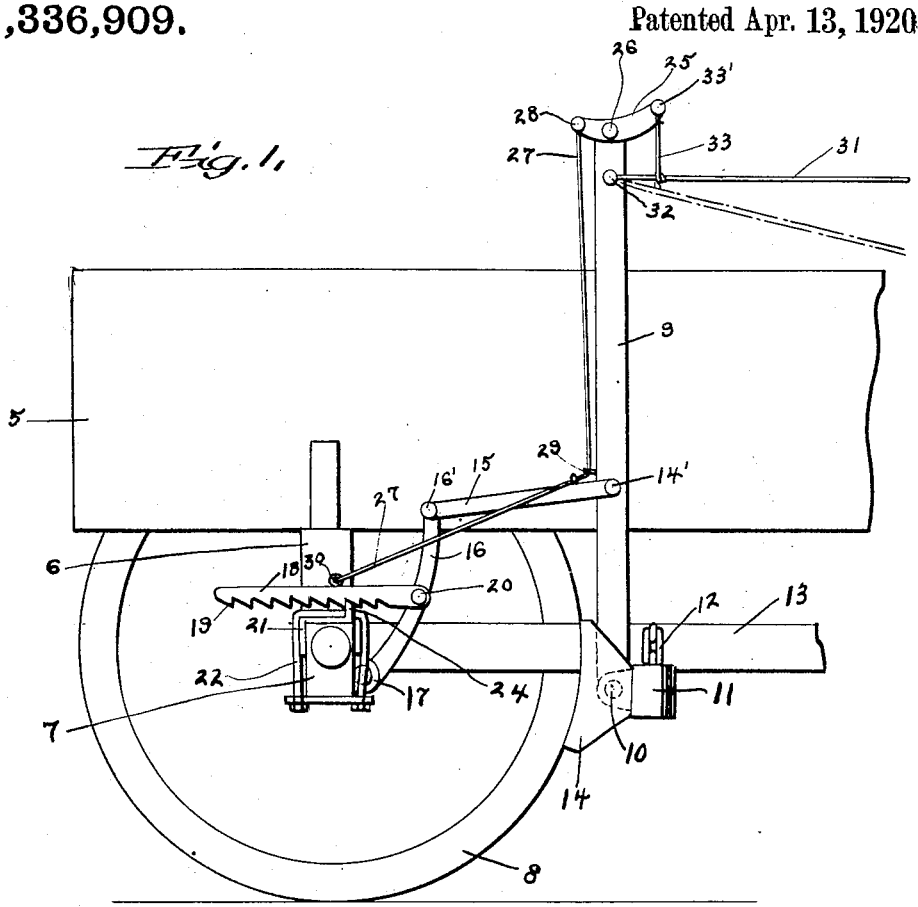
Figure 2:
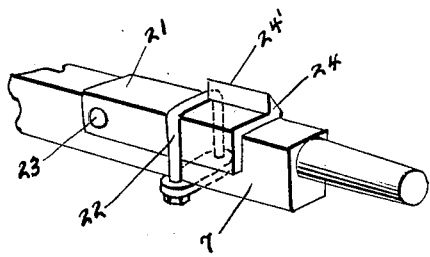

In the accompanying drawings forming a part of this specification and in which like numerals are employed to designate like parts throughout the same, Figure 1, is a fragmentary side view of a wagon with my improvement attached thereto, and Fig. 2, is a perspective view of the rear axle showing the means employed for attaching my locking plate thereto.

In the drawings, wherein for the purpose of illustration, I have shown a preferred embodiment of my invention, the numeral 5 designates the body of a wagon supported upon the bolster 6 carried by the square axle 7 which is equipped with wheels 8.

Pivotally attached to the sides of the wagon body is a vertically extending brake lever 9 which has its lower end pivotally connected as at 10, to the cross beam 11, which is loosely supported by means of links 12 connected to the longitudinally extending beam 13. Connected to each end of the cross beam 11 is a brake shoe 14 of the usual configuration adapted to contact with the surface of the wheels 8 for stopping the same.

Pivotally connected to the brake lever 9 adjacent the bottom of the wagon body at 14' is a lever 15 which extends rearwardly. The free end of the lever 15 is pivotally connected to the free end of the upwardly extending arcuate shaped lever 16, as at 16', which has its opposite end journaled in the bearing 17 attached to the axle 7. These levers form a toggle link between the brake lever 9 and the rear axle 7. A bar 18 having ratchet teeth 19 along its lower longitudinal edge is pivotally connected, as at 20, to the arcuate shaped lever, intermediate its length and extends rearwardly over the rear axle in close proximity thereto. A substantial U shaped plate 21 is attached to the upper side of the square axle 7 by means of the U shaped clamp 22 and the bolt 23. This plate 21 along its forward longitudinal edge approximately half way its length is provided with an upwardly extending lug 24 as clearly shown in Fig. 2. The upper edge of the lug is beveled to provide a sharp edge 24' for engaging the ratchet teeth 19 of the bar 18. Thus it is obvious upon application of the brake the ratchet bar 18 will be moved rearwardly and the teeth 19 will engage the lug 24, whereby the brake shoes are locked in their applied position.

The releasing mechanism consists of an arcuate shaped arm 25 pivoted to the upper end of the brake lever 9 slightly off center, as at 26, so that the forward end of the arm 25 will extend slightly farther from the edge of the brake lever than the rear end. A flexible cable 27 is connected to the rear end of the arm 25 as at 28 and extends downwardly along the edge of the brake lever 9 passing through the eye 29 and then rearwardly at an angle where it is connected to the ratchet bar 18 approximately intermediate its length by the eye screw 30. The numeral 31 designates the operating cable having one end connected to the brake lever 9 adjacent the upper end thereof, as at 32, and its opposite end attached to the wagon. This cable is joined to the forward end of the lever 25 by the cable 33, as at 33', so that the movement of the operating cable 31 will operate both the locking mechanism and the brake. When the cable 31 is drawn forward in a straight line the brake will be applied in the usual manner and locked.

However, when it is desired to release the locking mechanism it is only necessary to pull the cable 31 downwardly as shown in dotted lines in Fig. 1, which rocks the arm 25 so that the ratchet rod 18 is lifted upwardly to such an extent that the ratchet teeth are disengaged from the edge 24' of the lug 24 which enables the brake to be released.

In operation, my improvement may be attached to any wagon of the ordinary structure and will provide means whereby the brake may be locked in its set position when the wagon is descending steep grades or at any other desirable time, thus enabling the driver to have use of both his hands. This result is accomplished by attaching a device of the foregoing structure to the brake of any vehicle, so that when the brakes are applied the same will be automatically locked in their applied position. As is obvious, when the brake lever 9 is moved rearwardly the ratchet bar 18 will pass over the lug 24 and the teeth 19 of the bar will engage the edge 24' of the lug, thus effectually locking the brake. To release the lock, all that is necessary is to pull the operating cable 31 of the brake lever downwardly so that the arm 25 will be rocked which will cause the ratchet bar 18 to be lifted from out of engagement with the lug 24 whereupon the brake will move back to its normal position. It is clearly seen that a device has been produced which will efficiently perform the function for which it is designed and may be attached to any vehicle of the ordinary structure.

It is to be understood that the form of my invention herewith shown and described is to be taken as a preferred example of the same, and that certain changes in the shape, size, and arrangement of parts may be resorted to without departing from the spirit of the invention or the scope of the subjoined claims.

Having thus fully described my invention, I claim:—

1. In combination with a wagon, a brake, a lever extending rearwardly from the brake lever, a second lever extending outwardly from the rear axle and connected to the first mentioned lever, a ratchet bar pivoted intermediate the length of the second mentioned lever, and means engaging the ratchet bar for locking the brake when applied.

2. In combination with a wagon, a brake, a lever connected to the brake lever, an arcuate shaped lever pivoted to the rear axle and connected to the first mentioned lever, a plate secured to the rear axle having an upwardly extending lug, and a ratchet bar attached to the arcuate shaped lever and passing over said lug, said ratchet bar being adapted to engage the lug for locking the brake when applied.

3. In combination with a wagon, a brake, a lever connected to the brake lever, a second lever connected to the first mentioned lever, a plate secured to the rear axle, said plate having an upwardly extending lug, a ratchet bar passing over said lug and connected to the second mentioned lever, said bar being adapted to engage the lug for locking the brake when applied, and means for releasing both the locking means and brake.

4. In combination with a wagon, a brake, a toggle link between the rear axle and the brake lever, a ratchet bar pivotally associated with said link, and means carried by the rear axle coöperating with the bar for the purpose specified.

5. In combination with a wagon, a brake, a toggle link between the rear axle and the brake lever, a ratchet bar pivotally associated with said link, means carried by the rear axle, coöperating with the bar and means for releasing said bar.

6. In combination with a wagon, a brake, levers extending between the brake lever and rear axle, a ratchet bar connected with one of said levers, a plate secured to the axle having a lug extending upwardly therefrom, said ratchet bar coöperating with said lug, an arcuate shaped arm at the upper end of the brake lever, a cable connecting the rear end of the arm with the ratchet bar, and a cable jointly connecting the forward end of the arm and brake lever for the purpose specified.

7. In combination with a wagon, a brake, a toggle link between the rear axle and the brake lever, a ratchet bar pivotally associated with the link and extending rearwardly over the axle, a U-shaped plate rigidly secured to the axle having an upwardly extending lug, said ratchet bar coöperating with the lug, an arcuate shaped arm pivoted to the upper end of the brake lever, a cable extending from the rear end of the arm to the ratchet bar, a second cable jointly connecting the forward end of said arm and brake lever for applying and releasing said brake.

In testimony whereof, I have affixed my signature in the presence of two witnesses.

JAMES S. LOCKARD.

Witnesses:
  O. T. BAYNARD,
  ROY P. WHITLOCK.